Patented Dec. 6, 1949

2,490,459

UNITED STATES PATENT OFFICE 2,490,459

PASTE SHAMPOO

Werner Max Lilienfeld, Chicago, Ill., assignor to The Emulsol Corporation, Chicago, Ill., a corporation of Illinois No Drawing. Application April 10, 1946, Serial No. 661,081

16 Claims. (Cl. 252—152)

My invention relates to hair shampoos and is particularly concerned with improvements therein, especially in regard to the preparation of shampoos in the form of normally solid creams or pastes, hereafter referred to simply as pastes.

It has heretofore been suggested to prepare shampoos from sulfates of coconut oil fatty acid amides of monoethanolamine. The deficiencies of such shampoos are mentioned in U. S. Patent No. 2,353,081 and, in order to overcome such deficiencies, said patent proposes the utilization, as the foaming or cleansing agents, of sulfates of amides of monoethanolamine with a specific mixture of fatty acids, namely, a mixture of caproic, caprylic and capric acids of which mixture the caprylic acid comprises about 50%.

Sulfates of amides of monoethanolamine with lauric acid, myristic acid, coconut oil fatty acids and the like, in the form of sodium salts, apart from their other deficiencies, are insufficiently soluble in water to prepare liquid shampoos having a desired concentration of such agents and, therefore, they have been utilized in the form of monoethanolamine salts, as disclosed in U. S. Patent No. 2,237,629. The monoethanolamine salts of sulfates of amides of monoethanolamine with lauric acid, myristic acid, and the like are not generally adaptable to the formation of paste shampoos. The sodium salts of the sulfates of amides of monoethanolamine with lauric acid, myristic acid, and the like are also, generally speaking, on the basis of previously existing knowledge, unsuitable for the preparation of fully satisfactory paste shampoos.

I have found, in accordance with my present invention, that hydrophilic derivatives, for example, sulfates, sulfoacetates, sulfosuccinates, of higher fatty acid amides of hydroxy-alkyl primary amines, particularly of certain types of hydroxy-alkyl primary amines, as hereafter described, may be converted into paste shampoos of excellent appearance, texture and consistency. Of especial utility, for use in the practice of my invention, are the sodium salts of the sulfates and sulfosuccinates of the amides of monoethanolamine and isopropanolamine with lauric or myristic acids or coconut oil fatty acids or fractions thereof containing predominately lauric acid, such compounds being represented by the formulae

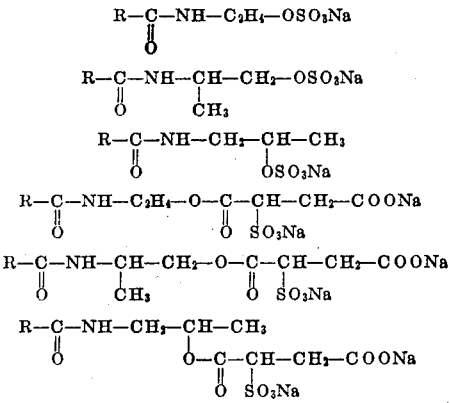

where

is the lauric or like fatty acid acyl radical. Such types of compounds have heretofore been disclosed, as see, for example, U. S. Patents Nos. 1,981,792; 2,216,617 and 2,236,528, but I prefer to use the compounds, where the sulfate derivatives are employed, when prepared pursuant to the procedures described in the copending application of Herbert I. Bernstein and Charles F. Fuchs, Serial No. 641,660, filed January 16, 1946. For the preparation of paste shampoos pursuant to my present invention, I prefer particularly to utilize sulfated or sulfonated products prepared from mixtures of amides of isopropanolamine and monoethanolamine, especially where the sulfates or sulfonate derivatives of the amides of monoethanolamine are present in a proportion of about 1:1.5 to about 1:3 of the sulfates or sulfonate derivatives of the amides of isopropanolamine.

The detergent hydrophilic derivatives of the higher fatty acid amides of the hydroxy-alkyl primary amines which may be utilized pursuant to the present invention for conversion into paste shampoos include not only the sulfates, sulfoacetates, and sulfosuccinates but also, for example, the phosphates (including orthophosphates, metaphosphates, pyrophosphates and tetraphosphates and mixtures thereof); sulfo-fatty acid esters and aliphatic and aromatic sulfo mono- and poly-carboxylic acid esters including sulphopropionates, sulfomaleates, sulfofumarates, sulfophthalates and the like; quaternary ammonium derivatives, and the like. Such compounds are disclosed in various patents, among which may be mentioned Nos. 2,178,139; 2,190,133; 2,236,529; 2,236,530 and 2,242,211.

I have discovered that paste shampoos of excellent texture, appearance, stability, and other desirable properties, may be produced from hydrophilic derivatives of higher fatty acid amides of hydroxy-alkyl primary amines, and particularly sodium salts of sulfated higher fatty acid amides of hydroxy-alkyl primary amines, by the incorporation thereinto of certain ingredients. These ingredients are water-soluble inorganic salts and fatty acid amides of monoethanolamine in which the fatty acid radical contains predominately from 12 to 14 carbon atoms. In the particularly preferred embodiments of my invention, certain supplemental ingredients are also employed, namely, buffers and soaps. The invention will be described hereinafter particularly in relation to the preparation of paste shampoos from salts of sulfated higher fatty acid amides of hydroxy-alkyl primary amines, but it will be understood that the teachings are applicable to other detergent hydrophilic derivatives of the higher fatty acid amides of hydroxy-alkyl primary amines.

The water-soluble inorganic salts may be selected from any of the large group such as sodium chloride, potassium chloride, sodium sulfate, potassium sulfate, sodium nitrate, potassium nitrate, magnesium chloride, magnesium nitrate, magnesium sulfate, ammonium chloride, ammonium nitrate, ammonium sulfate, or mixtures of various of said salts or other salts provided that they do not precipitate each other. Of particular efficacy is sodium chloride since its water solubility varies only slightly at different temperatures with the result that crystallization thereof does not take place in the event that the finished paste shampoo product, in storage or in transit, is subjected to relatively low temperatures. The proportion of the salt used, while amounting to at least several percent, is somewhat variable, good results being obtained, for example, with proportions of the order of about 9% to about 20%, based on the weight of the finished shampoo. However, somewhat lesser proportions or somewhat greater proportions may be employed although, in general, such is not preferred. Products containing from about 9% to about 12% of salt represent, ordinarily, the most advantageous embodiments of the invention, particularly where the paste shampoos contain soap, as hereinafter described.

The fatty acid amides of monoethanolamine, which are utilized in the paste shampoos of my invention, contain predominately, as stated above, 12 to 14 carbon atoms in the fatty acid radicals thereof. Such amides, therefore, include the lauric acid amide of monoethanolamine, the myristic acid amide of monoethanolamine, coconut oil mixed fatty acid amides of monoethanolamine, as well as amides of monoethanolamine prepared from special fractions of fatty acids which predominate in either lauric acid or myristic acid or mixtures thereof. The aforesaid amides of monoethanolamine are, in general, employed in minor proportions in the paste shampoos of my invention. As a general rule, the use of from about 1.5% to about 6% of such amides is satisfactory although, in certain cases, slightly lesser amounts or slightly greater amounts may be employed without adverse effect. I have also found that the aforesaid fatty acid amides of monoethanolamine may be replaced, in part, or supplemented by, cetyl alcohol or spermaceti or mixtures thereof. In general, the amount of cetyl alcohol or spermaceti, or both, where such are employed, is small, in the usual case being under 1%.

I prefer, also, to incorporate in the paste shampoos of my invention, a minor proportion of a soap or a mixture of soaps. For best results, the soaps which are utilized should be derived from fatty acids having a molecular weight higher than that of stearic acid. In the usual case, such soaps will be derived from mixtures of fatty acids and, in such event, the average molecular weight of the fatty acid mixture should be higher than that of stearic acid. A typical example of such a fatty acid mixture is so-called "Snodotte" acid which comprises a mixture containing, approximately, 7% myristic acid, 8% palmitic acid, 40% stearic acid, 20% arachidic acid, and 25% behenic acid. I prefer to employ the sodium soaps or salts of such fatty acids although the soaps with other cations, for example, potassium, ammonium, lithium, and organic bases may be utilized. The amount of soap utilized, where employed, is of the order of several percent, from about 5% to about 7% being satisfactory in most cases. It will be understood, in this general connection, that, in the examples referred to hereinafter, the sodium hydroxide and the "Snodotte" acid called for, among the ingredients of the shampoo pastes, react, in the process of manufacture of the shampoo pastes, to produce soaps.

It is also advantageous to employ a buffer or buffers in the paste shampoos of my present invention in order to provide products having, and maintaining, a desired pH. In general, I prefer that the paste shampoos of my present invention have a pH in the range of about 8.0 to about 8.5. To this end, buffers may be used such as, for example, phosphate buffers, borate buffers, and the like, a typical buffer being, for example, disodium monohydrogen phosphate. If desired, trisodium phosphate may be utilized, sufficient acid being added thereto to bring its pH down to the desired degree.

In the particularly preferred embodiments of my invention, the water content of the paste shampoos is of substantial magnitude, constituting, in most cases, not substantially less than 50%, by weight, of the paste shampoo and, preferably, constituting the major ingredient thereof.

The following table shows illustrative examples of formulations for the preparation of paste shampoos following the teachings of my present invention. It will be understood, of course, that these examples are not to be construed as in any way limitative of the full scope of my invention as various changes and modifications may be made in the light of the guiding principles disclosed herein. All values given in the table are parts or percentages by weight.

| Example No. | Sulfated Lauric Acid Amide of Monoethanolamine (Na Salt) | Sulfated Lauric Acid Amide of Isopropanolamine (Na Salt) | Disodium Hydrogen Phosphate | Sodium Chloride | Lauric Acid Amide of Monoethanolamine | "Snodotte" Acid | Sodium Hydroxide | Cetyl Alcohol | Spermaceti | Water |
|---|---|---|---|---|---|---|---|---|---|---|
| 1 | 6 | 12 | 1.5 | 19.3 | 6 | | | | | 55.2 |
| 2 | 7.5 | 15 | 1.875 | 18.5 | 5 | | | | | 52.125 |
| 3 | 4 | 8 | 1 | 9.7 | 3.3 | 4.04 | 0.56 | | | 68.4 |
| 4 | 4 | 8 | 1 | 9.7 | 2.8 | 4.04 | 0.56 | 0.5 | | 68.4 |
| 5 | 4 | 8 | 1 | 9.7 | 2.8 | 4.04 | 0.56 | | 0.5 | 68.4 |
| 6 | 5 | 10 | 1.25 | 9 | 3 | 4.5 | 0.5 | | | 66.75 |
| 7 | 5 | 10 | 1.25 | 9 | 2.5 | 4.5 | 0.5 | 0.5 | | 66.75 |
| 8 | 5 | 10 | 1.25 | 9 | 2.5 | 4.5 | 0.5 | | 0.5 | 66.75 |
| 9 | 5 | 10 | 1.25 | 11.5 | 1.85 | 4.66 | 0.59 | | | 65.15 |
| 10 | 5 | 10 | 1.25 | 11.5 | 1.55 | 4.66 | 0.59 | 0.3 | | 65.15 |
| 11 | 5 | 10 | 1.25 | 11.5 | 1.55 | 4.66 | 0.59 | | 0.3 | 65.15 |
| 12 | 6 | 12 | 1.5 | 10.8 | 4 | 6.03 | 0.67 | | | 59 |
| 13 | 6 | 12 | 1.5 | 10.8 | 3.4 | 6.03 | 0.67 | 0.6 | | 59 |
| 14 | 6 | 12 | 1.5 | 10.8 | 3.4 | 6.03 | 0.67 | | 0.6 | 59 |

| Example No. | Sulfosuccinic Acid Ester of Coconut Fatty Acid Amides of Monoethanolamine (Na Salts) | Sulfosuccinic Acid Ester of Lauric Acid Amide of Isopropanolamine (Na Salt) | Sodium Chloride | Lauric Acid Amide of Monoethanolamine | Water |
|---|---|---|---|---|---|
| 15 | 19.5 | | 12.5 | 2 | 66 |
| 16 | | 20.6 | 11.5 | 2.2 | 65.7 |

So far as the procedural steps in the preparation of the paste shampoos are concerned, they may be varied within relatively wide limits. Thus, for instance, in the case of Examples 1 and 2, all of the ingredients may be mixed together, with continuous stirring, at a temperature of about 70 degrees C. until a smooth, homogeneous product is obtained. Then, while continuously stirring, the product is slowly cooled to about 40 degrees C. and placed in jars or tubes or similar containers. In general, it is preferable to use a preservative, usually in proportions of about 0.1% to about 0.5% of the weight of the shampoo, and the preservative may be incorporated by dissolving it in a part of the water and adding it to the mixture with thorough stirring. Suitable preservatives are, for example, the methyl ester of parahydroxybenzoic acid and 8-hydroxy quinoline. Perfumes and colors or dyes are also, of course, optional ingredients and may be incorporated at any suitable stage of the process of manufacture.

In the case of Example 3, a preferred procedure comprises dissolving the sodium hydroxide in about 41 parts of the water and heating said solution to about 70 degrees C. The "Snodotte" acid and the lauric acid amide of monoethanolamine are melted together and, with continuous stirring, said molten mixture is added to the warm solution of sodium hydroxide. A mixture is made up of the remaining ingredients of the example, except for 2.5 parts of the sodium chloride and 7.5 parts of the water, and, while continuously stirring, said mixture, at room temperature or slightly above, is added to the previously prepared mixture of ingredients. Thereupon, the remaining sodium chloride and water, in the form of a solution, is added with continuous stirring during which time the product is allowed to cool down gradually to about 35 degrees C. at which time it is filled into containers. The products of the remaining examples may be made in a similar manner, the cetyl alcohol or spermaceti, where used, being melted together with the "Snodotte" acid and the lauric acid amide of monoethanolamine.

The product of Example 15 was prepared by mixing 200 parts, by weight, of a concentrate containing about 38% of the sodium salts of the sulfonsuccinic acid esters of coconut fatty acid amides of monoethanolamine with 184 parts, by weight, of a saturated brine solution. The resulting mixture, which had a pH of 5 to 6, was then warmed to 70 degrees C. and there were stirred thereinto 7.6 parts, by weight, of the lauric acid amide of monoethanolamine, the latter being added in either the molten state or as a fine powder. The stirring was continued for about 20 minutes while allowing the mixture to cool. The resulting paste was colorless, retained its consistency at a temperature of 40–45 degrees C., and had excellent shampoo properties. The product of Example 16 was made in a manner similar to that just described for Example 15.

The hydroxy-alkyl primary amines, the detergent hydrophilic derivatives of whose amides with higher molecular weight fatty acids are utilized pursuant to the present invention, include, for example, monoethanolamine, monopropanolamine, and hydroxy-alkyl primary amines of that type in which there is at least one lower alkyl radical, such as methyl, ethyl, propyl or butyl, directly attached to the carbon atom to which the amine or hydroxyl radical is attached. Illustrative examples of such latter hydroxy-alkyl primary amines are isopropanolamine, 2-methyl-2-aminopropanol, 2-ethyl-2-aminopropanol, 2-aminobutanol, 2-aminopentanol, 3-aminopentanol, and the like. The sulfates of the amides of said latter type of amines are particularly useful in conjunction or in admixture with sulfates of amides of monoethanolamine, as previously described.

The higher molecular weight fatty acids, the sulfates or other hydrophilic derivatives of whose amides of the hydroxy-alkyl primary amines are utilized pursuant to the present invention, should contain from 8 to 18 carbon atoms. Illustrative examples of such fatty acids are caprylic acid, capric acid, lauric acid, myristic acid, palmitic acid, stearic acid, and oleic acid, as well as mixtures thereof. Of especial utility are lauric acid, coconut oil mixed fatty acids, and particular fractions which have a high content of lauric acid. The intermediate amides, prior to sulfation or the like, may be produced from such acids or their functional derivatives such as the acyl halides and esters in accordance with known practices.

While the invention has been described in detail, it is not to be construed as being limited except as expressly set out in the claims.

What I claim as new and desire to protect by Letters Patent of the United States is:

1. An improved shampoo, in the form of a paste, comprising a mixture of from about 10% to about 25% of a water-soluble salt of a sulfate of a higher fatty acid amide of a hydroxy-alkyl primary amine having good detergent properties, in which the higher fatty acid radical contains from 8 to 18 carbon atoms, from about 9% to about 20% of a water-soluble inorganic salt, from about 1.5% to about 6% of a fatty acid amide of monoethanolamine in which the fatty acid contains predominately from 12 to 14 carbon atoms, and not substantially less than 50% of water.

2. An improved shampoo, in the form of a paste, comprising a mixture of from about 10% to about 25% of a water-soluble salt of a sulfate of a higher fatty acid amide of a hydroxy-alkyl primary amine in which the fatty acid radical contains predominately from 12 to 14 carbon atoms, from about 9% to about 20% of sodium chloride, from about 1.5% to about 6% of the lauric acid amide of monoethanolamine, up to about 7% of a water-soluble soap of a mixture of fatty acids the average molecular weight of which is higher than that of stearic acid, and not substantially less than 50% of water.

3. An improved shampoo, in the form of a paste, comprising (a) sodium salts of fatty acid amides of sulfated monoethanolamine and (b) sodium salts of fatty acid amides of sulfated hydroxy-alkyl primary amines in which there is at least one lower alkyl radical directly attached to the carbon atom to which the alcoholic hydroxyl is attached, the fatty acid radicals of said amides containing predominately from 12 to 14 carbon atoms, (b) being present in proportions of the order of 1.5 to 1 of (a) to 3 to 1 of (a), (a) and (b) together being present in proportions ranging from about 10% to about 25%, from about 9% to about 20% of an inorganic water-soluble salt, from about 1.5% to about 6% of a fatty acid amide of monoethanolamine in which the fatty acid radical contains predominately from 12 to 14 carbon atoms, and not substantially less than 50% of water.

4. An improved shampoo, in the form of a paste, comprising (a) a water-soluble salt of a higher molecular weight fatty acid amide of sulfated monoethanolamine, and (b) a water-soluble salt of a higher molecular weight fatty acid amide of a sulfated hydroxy-alkyl primary amine in which there is at least one lower alkyl radical directly attached to the carbon atom to which the alcoholic hydroxyl is attached, the higher molecular weight fatty acid radicals of said amides containing from 8 to 18 carbon atoms, (b) being present in proportions of the order of 1.5 to 1 of (a) to about 3 to 1 of (a), (a) and (b) together being present in proportions ranging from about 10% to about 25%, from about 9% to about 20% of an alkali metal chloride, from about 1.5% to about 6% of a fatty acid amide of monoethanolamine in which the fatty acid radical contains predominately from 12 to 14 carbon atoms, and a major proportion of water.

5. An improved shampoo, in the form of a paste, comprising (a) a water-soluble salt of a higher molecular weight fatty acid amide of sulfated monoethanolamine, (b) a water-soluble salt of a higher molecular weight fatty acid amide of a sulfated hydroxy-alkyl primary amine in which there is at least one lower alkyl radical directly attached to the carbon atom to which the amide nitrogen is attached, the higher molecular weight fatty acid radicals of said amides containing from 8 to 18 carbon atoms, (b) being present in proportions of the order of 1.5 to 1 of (a) to about 3 to 1 of (a), (a) and (b) being present in a total proportion of about 10% to about 25%, from about 9% to about 20% of an inorganic water-soluble salt, from about 1.5% to about 6% of a fatty acid amide of monoethanolamine in which the fatty acid radical contains predominately from 12 to 14 carbon atoms, from about 5% to about 7% of a water-soluble soap of a mixture of fatty acids of which the average molecular weight is higher than that of stearic acid, and a major proportion of water.

6. An improved shampoo, in the form of a paste, comprising (a) sodium salts of fatty acid amides of sulfated monoethanolamine, (b) sodium salts of fatty acid amides of sulfated hydroxy-alkyl primary amines in which there is at least one lower alkyl radical directly attached to the carbon atom to which the amide nitrogen is attached, the fatty acid radicals of said amides containing predominately from 12 to 14 carbon atoms, (b) being present in proportions of the order of 1.5 to 1 of (a) to 3 to 1 of (a), (a) and (b) being present in a total proportion of about 10% to 25%, from about 9% to about 20% of sodium chloride, from about 1.5% up to about 6% of lauric acid amide of monoethanolamine, and a major proportion of water.

7. An improved shampoo, in the form of a paste, comprising from about 10% to about 25% of sodium salts of higher molecular weight fatty acid amides of sulfated hydroxy-alkyl primary amines in which there is at least one lower alkyl radical directly attached to the carbon atom to which the amide nitrogen is attached, the higher molecular weight fatty acid radical of said amides containing from 8 to 18 carbon atoms, from about 9% to about 20% of sodium chloride, from about 1.5% to about 6% of the lauric acid amide of monoethanolamine, and not substantially less than 50% of water.

8. An improved shampoo, in the form of a paste, comprising from about 10% to about 25% of a sodium salt of a sulfate of the lauric acid amide of an hydroxy-alkyl primary amine, from about 9% to about 20% of sodium chloride, from about 1.5% to about 6% of the lauric acid amide of monoethanolamine, and not substantially less than 50% of water.

9. An improved shampoo, in the form of a paste, comprising a mixture of from about 4% to about 8% of the sodium salt of the sulfate of the lauric acid amide of monoethanolamine, from about 8% to about 15% of the sodium salt of the sulfate of the lauric acid amide of isopropanolamine, from about 1% to about 2% of disodium hydrogen phosphate, from about 9% to about 20% of sodium chloride, from about 1.5% to about 6% of the lauric acid amide of monoethanolamine, and from about 5% to about 7% of a sodium soap of a mixture of fatty acids having an average molecular weight higher than that of stearic acid, and at least 50% of water, said shampoo having a pH of about 8.0 to about 8.5.

10. An improved shampoo, in the form of a paste, comprising a mixture of from about 10% to about 25% of a water-soluble salt of a sulfated higher fatty acid amide of a hydroxyalkyl primary amine having good detergent properties, from about 9% to about 20% of sodium chloride, from about 1.5% to about 6% of the lauric acid amide of monoethanolamine, and a major proportion of water, said shampoo being buffered to a pH of about 8.0 to about 8.5.

11. An improved shampoo, in the form of a paste, comprising a mixture of from about 4% to about 8% of the sodum salt of the lauric acid amide of monoethanolamine, from about 8% to about 15% of the sodium salt of the sulfate of the lauric acid amide of isopropanolamine, in which the higher fatty acid radial contains from 8 to 18 carbon atoms, up to about 2% of a buffer, from about 9% to about 20% of sodium chloride, from about 1.5% to about 6% of the lauric acid amide of monoethanolamine, from about 5% to about 7% of a sodium soap of a mixture of higher fatty acids having an average molecular weight higher than that of stearic acid, from about 0.3% to about 0.6% of a member selected from the group consisting of cetyl alcohol and spermaceti, and at least 50% of water, said shampoo having a pH of about 8.5.

12. An improved shampoo, in the form of a paste, comprising a mixture of from about 4% to about 8% of sodium salts of sulfates of coconut oil fatty acid amides of monoethanolamine, from about 8% to about 15% of sodium salts of sulfates of coconut oil fatty acid amides of isopropanolamine, from about 1% to about 2% of a buffer, from about 9% to about 20% of sodium chloride, from about 1.5% to about 6% of the lauric acid amide of monoethanolamine, from about 5% to about 7% of a soap of a mixture of fatty acids having an average molecular weight higher than that of stearic acid, and at least 50% of water, said shampoo having a pH of about 8.0 to about 8.5.

13. An improved shampoo, in the form of a paste, comprising a mixture of from about 10% to about 25% of a water-soluble hydrophilic derivative of a higher fatty acid amide of a hydroxyalkyl primary amine having good detergent properties, in which the higher fatty acid radical contains from 8 to 18 carbon atoms, from about 9% to about 20% of a water-soluble inorganic salt, from about 1.5% to about 6% of a fatty acid amide of monoethanolamine in which the fatty acid contains predominately from 12 to 14 carbon atoms, and not substantially less than 50% of water.

14. An improved shampoo, in the form of a paste, comprising a mixture of from about 10% to about 25% of a water-soluble salt of a sulfocarboxylic acid ester of a higher fatty acid amide of a hydroxy-alkyl primary amine having good detergent properties, in which the higher fatty acid radical contains from 8 to 18 carbon atoms, from about 9% to about 20% of sodium chloride, from about 1.5% to several percent of a fatty acid amide of monoethanolamine in which the fatty acid contains predominately from 12 to 14 carbon atoms, and not substantially less than 50% of water.

15. An improved shampoo, in the form of a paste, comprising from about 10% to about 25% of a detergent in the form of sodium salts of sulfosuccinic acid esters of higher fatty acid amides of hydroxy-alkyl primary amines selected from the group consisting of monoethanolamine and isopropanolamine, the higher fatty acid radicals of which contain predominately from 12 to 14 carbon atoms, from about 9% to 20% of sodium chloride, from about 1.5% to about 6% of a fatty acid amide of monoethanolamine in which the fatty acid contains predominately from 12 to 14 carbon atoms, and not substantially less than 50% of water.

16. An improved shampoo, in the form of a paste, comprising from about 10% to about 25% of a water-soluble hydrophilic derivative of a higher fatty acid amide of a hydroxy-alkyl primary amine having good detergent properties, in which the higher fatty acid radical contains from 8 to 18 carbon atoms, from about 9% to about 20% of sodium chloride, from about 1.5% to about 6% of a fatty acid amide of monoethanolamine in which the fatty acid contains predominately from 12 to 14 carbon atoms, and at least 50% of water.

WERNER MAX LILIENFELD.

REFERENCES CITED

The following references are of record in the file of this patent:

UNITED STATES PATENTS

| Number | Name | Date |
|---|---|---|
| 2,166,127 | Cahn | July 18, 1939 |
| 2,237,629 | Orelup | Apr. 8, 1941 |
| 2,374,213 | Katzman | Apr. 24, 1945 |

FOREIGN PATENTS

| Number | Country | Date |
|---|---|---|
| 838,169 | France | Nov. 28, 1938 |
| 877,090 | France | Aug. 24, 1942 |